United States Patent
Zangi

(10) Patent No.: US 7,715,864 B2
(45) Date of Patent: May 11, 2010

(54) ARRANGEMENT AND METHOD FOR CONTENTION-BASED MULTI-ACCESS IN A WIRELESS COMMUNICATION SYSTEM

(75) Inventor: Kambiz Zangi, Chapel Hill, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 857 days.

(21) Appl. No.: 11/531,587

(22) Filed: Sep. 13, 2006

(65) Prior Publication Data

US 2008/0064431 A1 Mar. 13, 2008

(51) Int. Cl.
H04B 7/00 (2006.01)
(52) U.S. Cl. .............. 455/522; 455/13.4; 455/67.13; 455/114.2; 455/435.1; 370/334; 370/338; 375/148; 375/267; 375/349
(58) Field of Classification Search .............. 455/522, 455/13.4, 67.13, 114.2, 435.1; 370/329, 370/334, 335, 338, 342, 346; 375/148, 227, 375/267, 299, 349
See application file for complete search history.

(56) References Cited

U.S. PATENT DOCUMENTS

| 6,307,851 | B1 * | 10/2001 | Jung et al. ............ 370/342 |
| 2002/0025812 | A1 * | 2/2002 | Ahlstrand et al. ........ 455/435 |
| 2004/0151146 | A1 * | 8/2004 | Hammerschmidt ....... 370/338 |
| 2005/0201482 | A1 * | 9/2005 | Iwasaki et al. ............ 375/267 |
| 2006/0285585 | A1 * | 12/2006 | Sampath .................. 375/227 |
| 2007/0058605 | A1 * | 3/2007 | Meylan et al. ............ 370/346 |
| 2008/0317155 | A1 * | 12/2008 | Orfanos et al. ............ 375/267 |

FOREIGN PATENT DOCUMENTS

| EP | 1 443 710 A2 | 8/2004 |
| WO | WO 2005/062542 | 7/2005 |
| WO | WO 2007/066938 A2 | 6/2007 |

OTHER PUBLICATIONS

Bertsekas and Gallager, "Data Networks"; Second Edition, 1992; pp. 271-288; Prentice-Hall, Inc., A Simon & Schuster Company, Upper Saddle River, NJ 07458 (USA); ISBN 0-13-200916-1.

(Continued)

Primary Examiner—Matthew D Anderson
Assistant Examiner—Shaima Q Aminzay

(57) ABSTRACT

An arrangement, method, and access point (AP) in a wireless telecommunication network for providing a user terminal (UT) with access to the network utilizing a contention-based, multi-access uplink channel. The AP includes $N_{rx}$ receive antennas, where $N_{rx}>1$, for receiving simultaneous uplink transmissions from a number of UTs, wherein the number of UTs transmitting on a given slot is less than or equal to $N_{rx}$. The AP sends power-control commands to the UTs to control the transmit power of each of the UTs to provide received signals of equal average power at the AP. The AP also instructs each UT to select its transmission data rate based on a noise level at the AP, so as to achieve a desired level of reliability. An MMSE receiver without successive interference cancellation receives the packets transmitted from the UTs and separately demodulates and decodes the packets received from each user terminal.

18 Claims, 4 Drawing Sheets

OTHER PUBLICATIONS

Tong, "Multipacket Reception in Random Access Wireless Networks: From Signal Processing to Optimal Medium Access Control" IEEE Communications Magazine; vol. 39, pp. 108-112; Nov. 2001; USA.

Zhao, "A Dynamic Queue Protocol for Multiaccess Wireless Networks With Multipacket Reception" IEEE Transactions on Wireless Communications, vol. 3, No. 6; pp. 2221-2231, Nov. 2004.

Tsatsanis, "Network-Assisted Diversity for Random Access Wireless Networks"; IEEE Transactions on Signal Processing, vol. 38, No. 3; pp. 702-711, Mar. 2000.

Nattavut Smavatkul, et al.; "Voice Capacity Evaluation of IEEE 802.11a with Automatic Rate Selection"; IEEE (Globecom 2003); pp. 518-522; Motorola Labs. 1301 E. Algonquin Rd., Schaumburg, IL 60196 USA.

Kristoffer Bruvold, et al.; "Adaptive Multiuser Detection for Mobile-Centric Fast Handoffs in Pseudocellular Wireless Networks"; pp. 796-800; Department of Electrical and Computer Engineering, University of California, Santa Barbara, CA 93106, USA.

* cited by examiner

ARRANGEMENT AND METHOD FOR CONTENTION-BASED MULTI-ACCESS IN A WIRELESS COMMUNICATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to wireless telecommunication systems. More particularly, and not by way of limitation, the invention is directed to an arrangement and method for contention-based multi-access for user terminals operating over wireless, fading, dispersive channels in a wireless communication system.

In wireless packet data systems, many user terminals (UTs) may attempt to transmit packets on an uplink channel to an access point (AP). The uplink multi-access scheme in most wireless systems is reservation based, i.e., each UT wishing to transmit on the uplink must first request the AP to schedule resources for it on the uplink. Once the AP has assigned resources for the requesting UT, and once this assignment has been communicated to the UT, the UT is allowed to transmit on the uplink using the assigned resources.

In some wireless systems, the UT can request uplink resources using a contention-based multi-access scheme (typically a slotted Aloha scheme). A good example of such an approach is WiMax (802.16) on the uplink. In WiMax, the uplink channel utilizes orthogonal frequency division multiplexing (OFDM), and therefore, the uplink channel is divided into many sub-carriers. Furthermore, the channel is divided into non-overlapping slots in the time domain. WiMax defines contention-based request channels where each channel consists of M contiguous sub-carriers. Assuming that the wireless channel does not change over these M sub-carriers, WiMax defines M orthogonal codes on each request channel. With M orthogonal codes, M UTs (each using a different one of these orthogonal codes) can simultaneously transmit requests to the AP on each slot. Each UT wishing to transmit on this request channel chooses one code among the possible M codes randomly; hence, it is possible that two transmitting UTs will chose the same code and this will lead to a collision and loss of the transmitted packets.

In effect, WiMax creates M parallel, contention-based, multi-access channels for transmission of requests. Each of these request channels essentially implements a slotted Aloha protocol. Each UT can transmit a packet at will on any slot using one of these M parallel channels, and as long as no other UT simultaneously transmits on the same slot and on the same one of the M request channels, the request will be received correctly by the AP.

The main shortcoming of a reservation-based multi-access scheme is extra delay incurred by each packet transmitted on the uplink channel. The process of requesting a resource reservation by the UT, and subsequently communicating the reservation from the AP to the UT adds extra delay between the time a packet arrives at the UT and the time the packet is transmitted on the uplink.

A problem with using only contention-based request channels (for example, WiMax) is that the UTs can only use the contention-based multi-access for making reservations. This approach does not allow for transmitting the actual data packets in contention mode. Thus, in this approach, the data packets still incur a delay due to the process of requesting resource reservations and communicating the reservations back to the UTs.

The contention-based request channels in WiMax are designed so that the UT can transmit only a very few bits of information to the AP. In WiMax there is no mechanism for setting the information rate on the contention-based request channels because data packets are not transmitted on this channel.

In wireline systems, Ethernet is by far the most commonly used contention-based, multi-access method. Ethernet uses a form of Carrier Sense Multiple Access (CSMA) in which each node wishing to transmit first listens to what is being transmitted on the channel for a while (carrier sensing), and if this node does not hear any other node transmitting, it would proceed to transmit on the channel. Unfortunately, CSMA is not well suited for wireless applications. In wireless systems, mobile stations typically transmit and receive (i.e., listen) on different frequencies; hence, it is not possible for most wireless mobile stations to listen to the transmissions of other mobile stations. Furthermore, due to line-of-sight and other restrictions in wireless environments, dispersed mobile stations would probably not be able to hear all of the other mobile stations transmitting to the AP. The AP may be able to receive a signal from a given transmitting mobile station, while this signal is not receivable (due to an obstruction) at another mobile station. This is typically referred to as the "hidden node problem", and it renders CSMA unsuitable for wireless environments. See, D. Bertsekas and R. Gallager, Data Networks, Second Edition, 1992, Prentice-Hall Inc., New Jersey.

Another well-known approach for implementing contention-based multi-access in wireless environments is to transmit data packets (not just access requests) using the slotted Aloha protocol. Slotted Aloha is a single-packet, contention-based approach meaning only one packet can get through per slot. If more than one UT attempts to transmit in a particular slot, nothing gets through. In such a system, each UT selects some random slot following the arrival of a data packet for transmission of the packet to the AP. As long as no other UTs transmit on the same slot, the AP correctly receives the data packet. If one or more UTs transmit on the same slot, the AP does not receive any packets correctly. It is well known, that the maximum number of correctly received packets-per-slot with this approach is $1/e \approx 0.36$. See, D. Bertsekas and R. Gallager, Data Networks, Second Edition, 1992, Prentice-Hall Inc., New Jersey. In other words, the maximum throughput with slotted Aloha is 0.36 (packets/slot). Similarly, the maximum offered load that can be supported with slotted Aloha at finite packet delay is 0.36 packets/slot. With slotted Aloha, as long as the number of new packet arrivals per slot is significantly below 0.36, the packet delay is quite low. However, this leads to low throughput in terms of packets/slot that can be received at the AP. This low throughput is the biggest disadvantage of a straightforward, single-packet, contention-based approach.

Another well-known approach for achieving low packet delay in wireless environments is contention-based multiaccess with multi-packet reception. See, for example, L. Tong, Q. Zhao, and G. Mergen, "Multipacket reception in random access wireless networks: from signal processing to optimal medium access control," *IEEE Commun. Mag.*, vol. 39, pp. 108-112, November 2001; Q. Zhao and L. Tong, "A dynamic queue protocol for multi-access wireless networks with multipacket reception," *IEEE Trans. Wireless Commun.*, vol. 3, pp. 2221-2231, November 2004; and M. K. Tsatsanis, R. Zhang, and S. Banerjee, "Network-assisted diversity for random access wireless networks," *IEEE Trans. Sig. Proc.*, vol. 48, pp. 702-711, March 2000. In this approach, it is assumed that the AP is capable of simultaneously receiving packets transmitted from up to $N_{rx}$ users. For example, it can be shown that the maximum number of correctly received packets with $N_{rx}=4$ is 2.95 packets/slot, compared to 0.36 packets/slot achievable with slotted Aloha.

Consider multi-packet reception with $N_{rx}=2$. Assume that UT-A and UT-B are simultaneously transmitting to the AP. At the AP, the signal transmitted from UT-A is seen as interference when the signal from UT-B is demodulated, and vise versa. In other words, there is a large mutual interference among the signals received from different simultaneously transmitting UTs. Naturally, the data rate that can be reliably received from UT-A depends on the strength of the signal received from UT-B (the stronger the signal received from UT-B, the lower the data rate that can be received from UT-A). Unfortunately, in a wireless environment, the signal received at the AP from each transmitting UT is a function of the channel between each particular UT and the AP. With widely separated UTs (compared to the wavelength of the carrier, which is 15 cm at 2 GHz carrier frequency), the channels between the AP and different UTs are very different. This implies that the data rate than can be received from UT-A depends on the number of UTs that transmit simultaneously with UT-A, and the channel each UT is using. Unfortunately, this information is not known to UT-A when UT-A transmits its packet, and thus the proper data rate cannot be determined. Hence, implementation of a wireless, contention-based, multi-packet system requires a method for each UT to determine the proper transmission data rate such that, with an appropriate receiver at the AP, $N_{rx}$ packets can be simultaneously decoded at the AP with high reliability.

What is needed in the art is an arrangement and method for contention-based multi-access that overcomes the shortcomings of the prior art. Such an arrangement and method should provide a specific transmission methodology at the UTs and a reception methodology at the AP, which enable the AP to correctly receive $N_{rx}$ simultaneously transmitted packets with a given degree of reliability (i.e., a small probability that a transmitted packet is incorrectly received at the AP). The present invention provides such an arrangement and method.

BRIEF SUMMARY OF THE INVENTION

The present invention provides an arrangement and method for multi-access by a number of user terminals (UTs) wishing to communicate with an access point (AP) over a wireless, fading, dispersive channel. The invention enables multiple UTs to use an uplink channel without coordination and with very little delay. The multi-access process is contention-based, i.e., there is very little coordination among the different UTs and the AP for purpose of determining which UT should transmit at a given time on the channel. The AP is assumed to have $N_{rx}$ receive antennas ($N_{rx}>1$), and the invention provides a multi-access process and system configuration such that if "m" UTs simultaneously transmit on an uplink channel slot, and m<=N>, the packets from all these transmitting UTs will be correctly decodable by the AP with a given desired level of reliability (that is, a given packet error probability). The invention also determines the maximum information rate at which each UT can transmit its packets, and have these packets correctly decoded by the AP with the given degree of reliability, as long as the number of transmitted packets per slot is less than or equal to $N_{rx}$.

The present invention reduces delays that occur in a reservation-based system, and it simultaneously increases the throughput compared to that achieved with classical slotted Aloha or contention-based multi-access methods.

Thus, in one aspect, the present invention is directed to an arrangement for providing a user terminal with access to an access point in a wireless telecommunication network. A plurality of user terminals communicates with the access point utilizing a contention-based, multi-access uplink channel having a defined bandwidth. The arrangement includes an access point having $N_{rx}$ receive antennas, wherein $N_{rx}>1$. The receive antennas receive simultaneous uplink transmissions from a number of user terminals, wherein the number of user terminals transmitting on a given slot is less than or equal to $N_{rx}$. The arrangement also includes power-control means for controlling transmit power of each of the user terminals to provide received signals of equal average power at the access point; means for instructing each of the user terminals to select its transmission data rate based on a noise level at the access point; and a receiver in the access point for receiving packets transmitted from the user terminals and for separately demodulating and decoding the packet received from each user terminal.

In another aspect, the present invention is directed to a method in a wireless telecommunication network for providing a user terminal with access to an access point, wherein the access point is equipped with a plurality of receive antennas, $N_{rx}$, and wherein a number of user terminals communicates with the access point utilizing a contention-based, multi-access uplink channel having a defined bandwidth. The method includes the steps of receiving simultaneous uplink transmissions from a number of user terminals, wherein the number of user terminals transmitting on a given slot is less than or equal to $N_{rx}$; controlling transmit power of each of the user terminals to provide received signals of equal average power at the access point; instructing each of the user terminals to select its transmission data rate based on a noise level at the access point; and separately demodulating and decoding the transmissions received from each user terminal.

The step of instructing each of the user terminals to select its transmission data rate may include the steps of receiving from a user, a desired probability that packets received by the access point will be correctly received and decoded; broadcasting the desired probability to the user terminals; and selecting by each user terminal, a transmission data rate which provides the desired probability that packets received by the access point will be correctly received and decoded.

In yet another aspect, the present invention is directed to an access point in a wireless telecommunication network for providing a user terminal with access to the network. A number of user terminals communicate with the access point utilizing a contention-based, multi-access uplink channel having a defined bandwidth. The access point includes a plurality, $N_{rx}$, of receive antennas for receiving simultaneous uplink transmissions from a number of user terminals, wherein the number of user terminals transmitting on a given slot is less than or equal to $N_{rx}$. The access point also includes power controlling means for sending power-control commands to each of the user terminals, wherein the commands instruct each of the user terminals to adjust its transmit power to provide received signals of equal average power at the access point. The access point also includes data rate controlling means for instructing each of the user terminals to transmit packets at a data rate based on a noise level at the access point; and a receiver for receiving and separately demodulating and decoding packets transmitted from the user terminals.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

Figure 1:
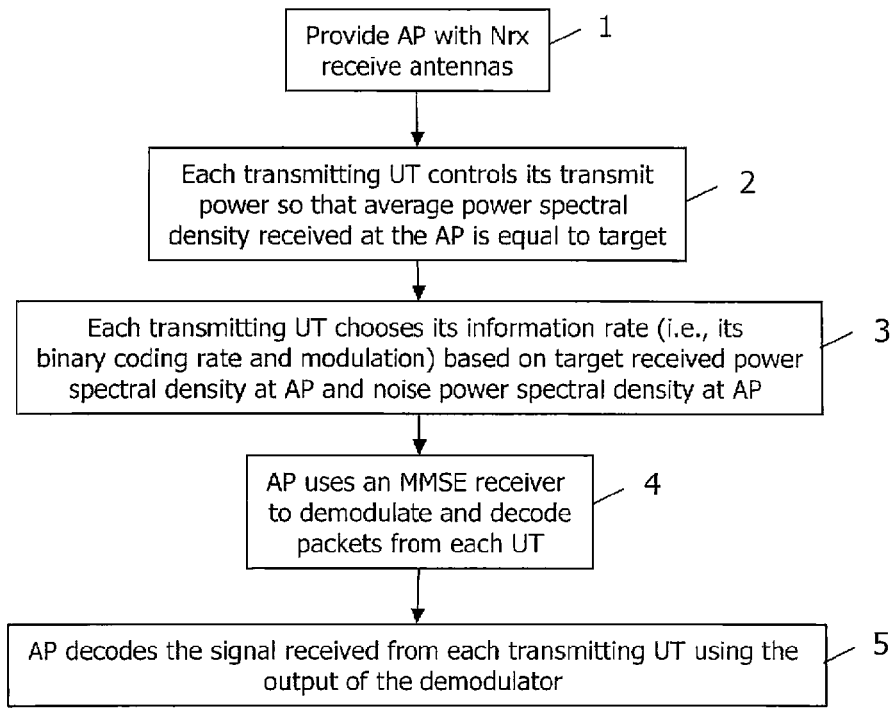
FIG. 1 is a flow chart illustrating the steps of an exemplary embodiment of the method of the present invention.

FIG. 1 is a flow chart illustrating the steps of an exemplary embodiment of the method of the present invention. At step 1, the access point (AP) is provided with $N_{rx}$ receive antennas, where $N_{rx}>1$. At step 2, each UT is slow-power-controlled to compensate for distance-dependent path loss and shadowing. The AP instructs each UT to adjust its transmit power so that the average power spectral density of the signal received from each user terminal at the access point, averaged over the defined bandwidth of the uplink channel, is equal to the same target value for each user terminal. Note that this is a slow power control that only compensates for the distance-dependent path loss between the mobile and the AP and for shadowing; however, this slow power control does not compensate for the fast fading variations of the channel between the mobile and the AP. At step 3, each transmitting UT chooses its information rate (i.e., the binary rate used by its encoder and its modulation format (e.g., BPSK, QPSK, etc)) based on the target received power spectral density (PSD) and the noise power spectral density at the AP. Optionally, each packet transmitted by each UT may be spread over a large number of independent frequencies. At step 4, the AP uses a minimum mean-square error (MMSE) receiver to demodulate the signal transmitted from each UT separately. At step 5, the AP uses a decoder (matched to the encoder in step 3) to decode the signal received from each transmitting UT.

With the present invention, as long as the number of UTs simultaneously transmitting in a given slot on the uplink channel is less than or equal to the number of AP receive antennas, $N_{rx}$, the packets from all of the UTs are decodable by the AP with a desired level of reliability.

Figure 2:
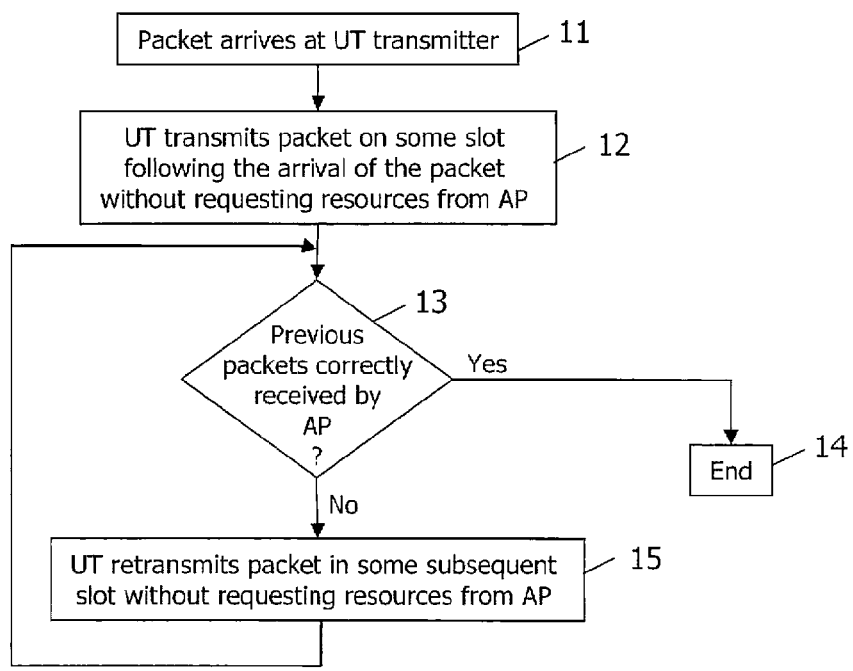
FIG. 2 is a flow chart illustrating the steps performed by each UT when transmitting a packet on the contention-based uplink channel.

FIG. 2 is a flow chart illustrating the steps performed by each UT when transmitting a packet on the contention-based uplink channel. At step 11, a packet arrives at a UT ready for transmission to the AP. At step 12, the UT transmits the packet in some slot following the arrival of the packet without requesting resources from the AP. At step 13, the UT detects whether its previously transmitted packet was correctly received by the AP. If so, the transmission process ends at step 14. If a previously transmitted packet was not correctly received by the AP, the UT retransmits the incorrectly received packet in some subsequent slot without requesting resources from the AP.

As noted above in step 22, in the present invention the UT transmits its packet without having to first request resources on the uplink channel. Thus, a packet arriving at a UT can be transmitted by the UT on the uplink with very little delay. Therefore, the invention provides low delay compared to reservation-based methods. Furthermore, the invention provides higher throughput than other single-packet, contention-based methods such as slotted ALOHA because up to $N_{rx}$ packets can be simultaneously received over the channel with the present invention as opposed to just one packet with a single-packet method. The maximum throughput with a single-antenna slotted ALOHA configuration is 1/e=0.36 successful packets per slot. In comparison, with $N_{rx}=4$ antennas at the AP, the present invention can deliver a maximum of almost 3 successful packets per slot.

Additionally, the present invention provides a specific procedure for setting the information rate for each transmitted packet so that, as long as the data rate chosen by each UT is below this information rate, the AP is able to correctly decode the transmitted packets (provided that less than $N_{rx}$ packets are transmitted simultaneously) with high reliability.

Each packet that is successfully transmitted with slotted ALOHA carries a slightly greater number of information bits than each packet transmitted by the arrangement of the present invention (with $N_{rx}=4$ antennas at the AP). However, the number of packets per second that get through with the present invention is many times more than the number of packets that get through with slotted ALOHA. The overall effect is that many more bits per second are successfully transmitted with the present invention than with slotted ALOHA.

Figure 3:
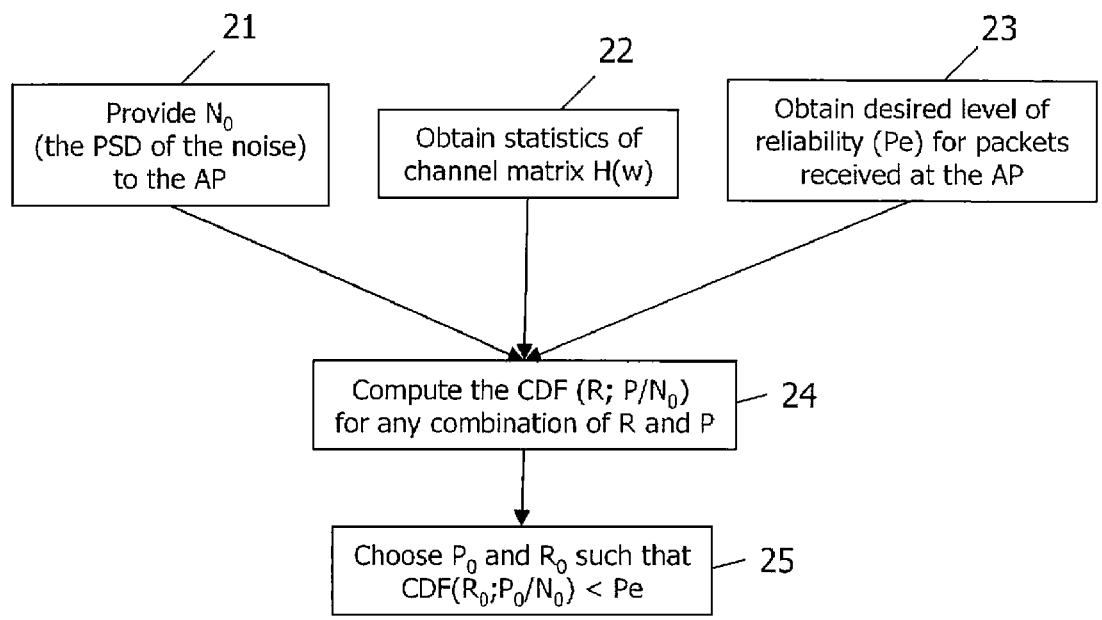
FIG. 3 is a flow chart illustrating the steps performed by the access point to determine the target received power spectral density and the target information rate for each mobile that wishes to transmit on the contention-based, multi-packet channel.
Figure 4:
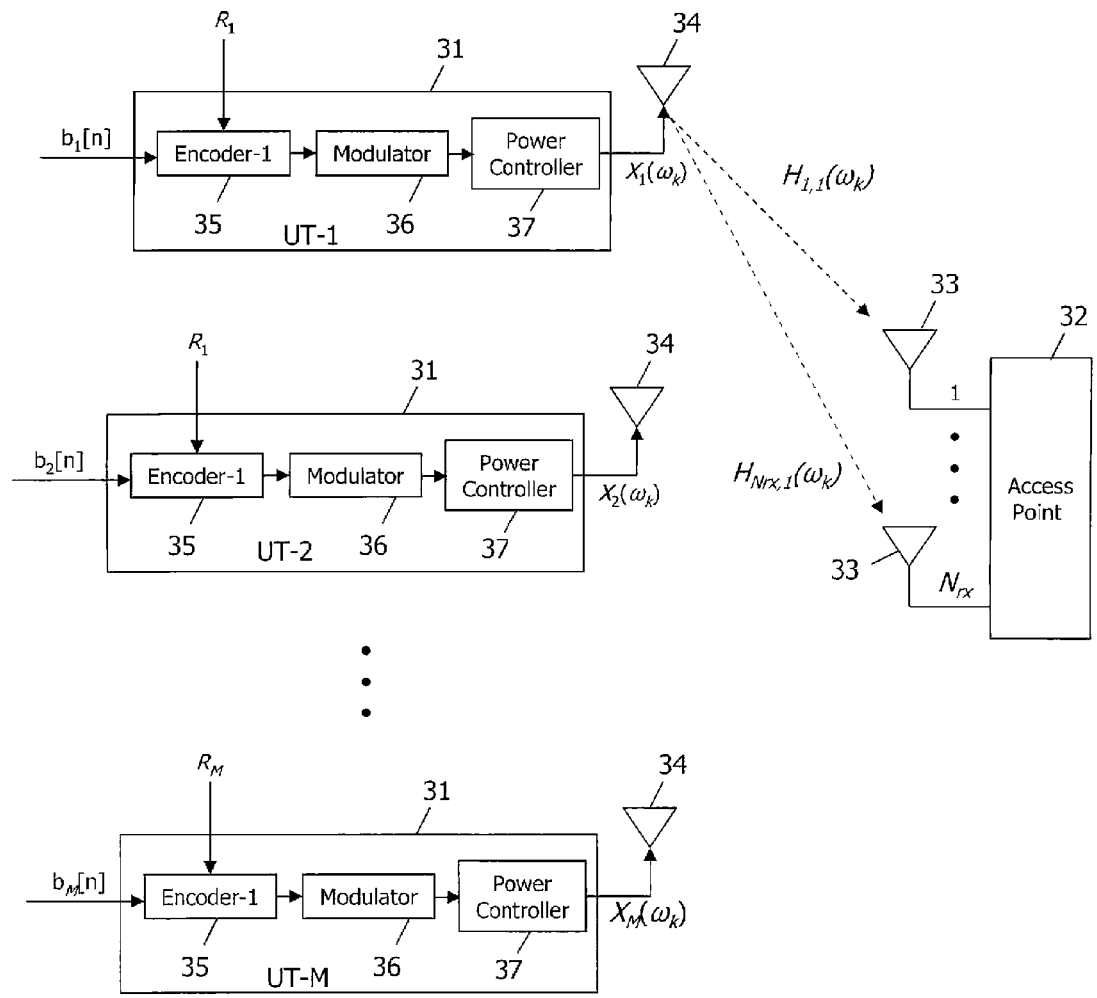
FIG. 4 is a simplified block diagram of an exemplary embodiment of the arrangement of the present invention.

FIG. 3 is a simplified flow chart illustrating the steps performed by the AP to determine the target received spectral density ($P_0$), and the information rate ($R_0$) to be used by encoders 35 in FIG. 4 to achieve any desired packet reception reliability ($P_e$), where $P_e$ is the probability that a packet transmitted by one of $N_{rx}$ simultaneously transmitting UTs is received incorrectly at the AP. At step 21, the AP is provided with the current value of the power spectral density of the noise at the AP ($N_0$). At step 22, the AP is provided with statistics of the channels between each transmitting UT and the AP. At step 23, a desired value for $P_e$ is provided to the AP. Finally, at step 24, the AP forms the cumulative distribution function (CDF) of $R_{MMSE}$ for any combination of (R,P). Finally, at step 25, the AP chooses the combination of (R,P) such that the probability of $R_{MMSE}$ falling below R is less than the specified $P_e$, and among these pairs, the AP will choose the pair with the highest value of R. This chosen pair is denoted by the target/desired received power spectral density level ($P_0$), and the target/desired average information rate ($R_0$).

FIG. 4 is a simplified block diagram of an exemplary embodiment of the arrangement of the present invention. The invention is illustrated in a contention-based multi-access system that employs multiple receive antennas. A number, M, of UTs 31 are communicating with an AP 32, which is equipped with $N_{rx}$ receive antennas 33. It is assumed that each UT uses a single transmit antenna 34. The information rate for the signal transmitted by UT-m at frequency $w_k$ is denoted by $R_m(w_k)$. The complex-valued, baseband channel between the i-th receive antenna at the AP and the j-th UT at frequency $w_k$ is denoted by $H_{i,j}(w_k)$. The digital baseband model at frequency $w_k$ is:

$$Y(w_k)=H(w_k)X(w_k)+N(w_k), \qquad (1)$$

where:

$Y(w_k)$ is a vector of size $N_{rx}$ whose i-th element is the received signal on the i-th receive antenna at frequency $w_k$;

$X(w_k)$ is a vector of size M whose j-th element is the signal transmitted by the j-th UT at frequency $w_k$;

$H(w_k)$ is the channel matrix of size $[N_{rx},N_{tx}]$ at frequency $w_k$; and $N(w_k)$ is a vector of size $N_{rx}$ whose i-th element is the noise received at the i-th receive antenna.

It is assumed that the noise is spatially and temporally white, i.e.:

$$E\{N(w_k)N'(w_k)\}=N_0 I_{N_{rx} \times N_{rx}} \qquad (2)$$

It is also assumed that all SISO channels are mutually independent, i.e.:

$$E\{H_{i,j}(w_k)H'_{k,l}(w_k)\}=0 \; \forall i \neq k \; j \neq l \qquad (3)$$

The term, $P_m(w_k)$ is used to indicate the power transmitted by the m-th UT at frequency $w_k$, and $P_m^\Sigma$ is used to denote the total power transmitted by the m-th user, i.e. $P_m^\Sigma = \Sigma_k P_m(w_k)$. It is also assumed that $P_m(w_k)=0$ or $P_m(w_k)=P_m$, i.e., the power transmitted by each UT on each frequency is either zero or a fixed non-zero value.

In the exemplary embodiment, all UTs use the same type of encoder 35 and modulator 36, and each UT uses just one encoder regardless of how many frequencies are used by each UT. Thus, the total information rate of the signal transmitted by UT-m is $R_m=\Sigma_k R_m(w_k)$. In the description that follows, a procedure is described for setting the information rates $\{R_m\}_{m=1}^M$ so that the M UTs in FIG. 4 can simultaneously communicate reliably with the AP. It is assumed that the AP broadcasts to the UTs, the power of the noise at the AP. Thus, $N_0$ is known to the UTs.

From FIG. 4, it can be seen that there is a strong mutual interference among the signals transmitted by the M UTs on the uplink. Thus, in the most general case, the information rate that a particular UT experiences depends on the signals received at the AP from all other UTs. In a contention-based multi-access system, the transmissions by different UTs on the channel are not coordinated. Therefore, without any restrictions on transmissions by the various UTs, the quality of the channel between each UT and the AP will vary greatly. Furthermore, the interference that the AP experiences while receiving the signal from UT-m depends on the channel between all other transmitting UTs and the AP. Again, it is not possible for a particular UT to know the channels from the other UTs to the AP at the time of transmission.

To make the impact of mutual interference among UTs less varied, a transmit power controller 37 employs slow power control to compensate for distance loss and shadowing. All UTs are power-controlled so that the average power spectral density received at each AP antenna from each UT is fixed. Note that this power control is meant to compensate only for slow fading and shadowing. Slow power control does not compensate for fast fading and frequency selective fading. The UTs may also employ frequency spreading to obtain increased frequency diversity.

The term $S_{jm}(w_k)$ is used to denote the signal received at the j-th receive antenna from the m-th UT, i.e.:

$$S_{jm}(w_k)=H_{jm}(w_k)X_m(w_k) \qquad (4)$$

With slow power control, it can be assumed that:

$$\frac{1}{L}\sum_{k=1}^{L}|S_{jm}(w_k)|^2 = P_0 \qquad (5)$$

where $P_0$ is the target/desired received power spectral density at the AP.

It can also be assumed that the information bits from each UT are spread over a large number of independent frequencies (i.e., frequencies sufficiently far apart that the channels at these frequencies are mutually uncorrelated).

By using slow power control and, optionally, frequency spreading, the maximum reliable sum information rate (i.e., $R_\Sigma = \Sigma_m R_m$) only depends on $P_0$. In other words, $R_\Sigma$ is independent of the specific realization of $H(w_k)$. However, making $R_\Sigma$ fixed does not guarantee that the individual rates (i.e., each $R_m$) are fixed. This issue is discussed further below.

Figure 5:
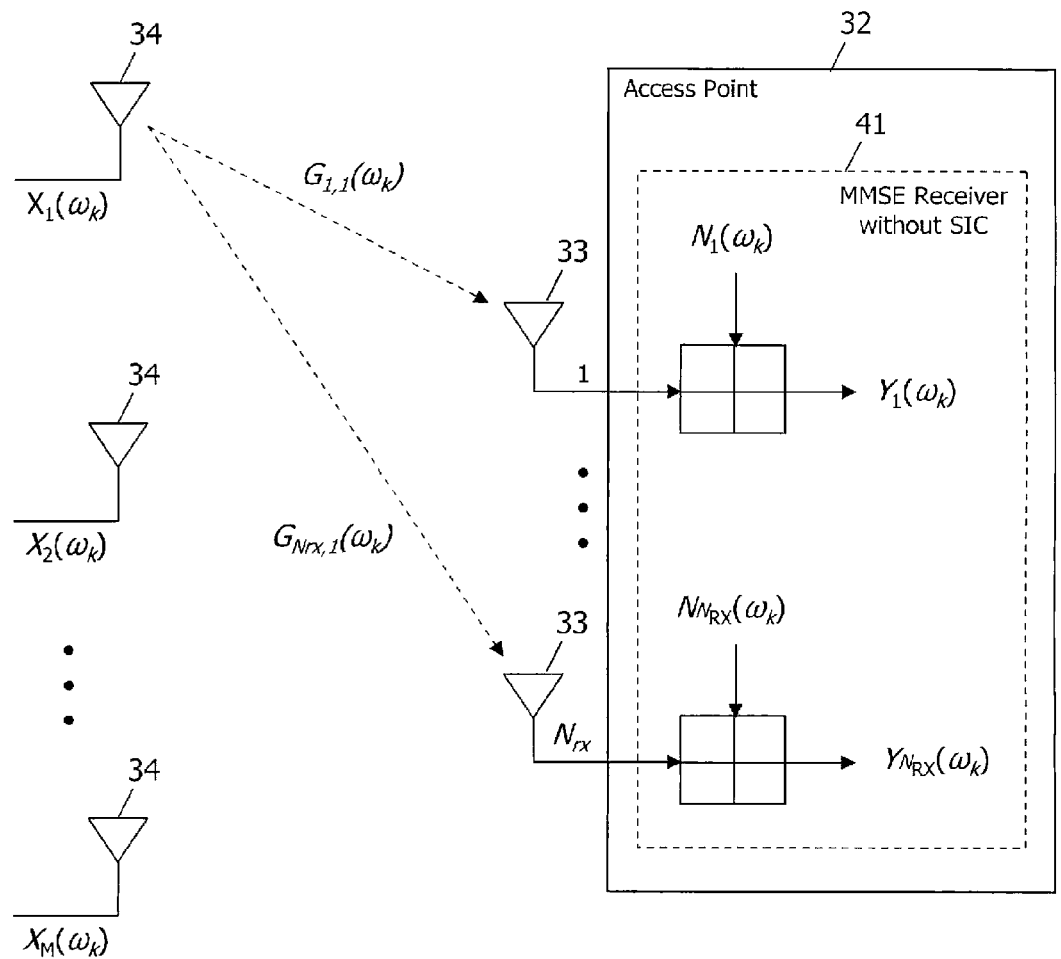
FIG. 5 is a simplified block diagram of the arrangement of the present invention wherein a power control factor has been absorbed into channels in the access point receiver.

FIG. 5 is a simplified block diagram of the arrangement of the present invention wherein a power control factor has been absorbed into channels in the MMSE receiver without SIC 41 in the AP 32. It is assumed that all UTs transmit on the following sub-set of frequencies:

$$W=\{w_1, w_2, \ldots w_L\}. \qquad (6)$$

Each SISO channel $G_{ij}(w)=\alpha_j H_{ij}(w)$ in FIG. 5 has an average power of 1, i.e.:

$$E\{|G_{ij}(w_k)|^2\}=1, \qquad (7)$$

and the average transmitted power from each UT is $P_0$, i.e., $$E\{|X_m(w_k)|^2\}=P_0 \qquad (8)$$

In other words, $G_{ij}(w)$ is set equal to $\alpha_j H_{ij}(w)$, where the scaling factor $\alpha_j$ is chosen to ensure that Equation (7) holds. We further assume that $(w_k)$'s are chosen so that:

$$E\{G_{ij}(w_k)G_{ij}(w_l)\}=\delta_{kl} \qquad (9)$$

With slow power control of Equation (5), the arrangement of FIG. 4 is equivalent to the one depicted in FIG. 5.

The average SNR at each frequency is then defined as:

$$SNR \equiv E\left\{\frac{|G_{ij}(w_k)X_j(w_k)|^2}{N_0}\right\} \qquad (10)$$

$$= \frac{P_0}{N_0} \qquad (11)$$

The maximum sum information rate that can be reliably transmitted at frequency $w_k$ in FIG. 5 is:

$$R_\Sigma(w_k)=\log det(I_{N_{rx} \times N_{rx}}+SNR G(w_k)G^*(w_k)), \qquad (12)$$

Even with a fixed sum rate $R_\Sigma$, the individual rate at which the m-th UT can communicate with the AP depends on the specific transmitter/receiver architecture employed. As an example, if the receiver at the AP uses a successive interference cancellation (SIC) algorithm in which the signal from the m-th UT is decoded before the signal from the n-th UT, the rate available to the n-th UT is higher than the rate available to the m-th UT. With SIC, the rate available to different transmitters depends on the order in which the signals from these transmitters are decoded.

In a contention-based, multi-access system, however, it is not known which UTs will be transmitting. Therefore, it is not possible to assign a particular decoding order to the different UTs prior to the start of transmission. This rules out the possibility of using a SIC receiver at the AP.

With a parallel interference canceling (PIC) receiver, the rate available to different transmitters is independent of the decoding order. Therefore, a PIC receiver may be used by the AP in FIG. 5, and each individual UT can transmit at $$\frac{1}{M} - th$$

of the sum rate. Stated otherwise:

$$R(i) = \frac{1}{M} R_\Sigma(SNR) \quad (16)$$

$$i = 1, \ldots, M$$

Typically, a PIC receiver is more computationally complex than a SIC receiver. Therefore, a low-complexity alternative to the PIC receiver is desirable. Preferably, a minimum mean-square error (MMSE) receiver without successive cancellation is used by the AP to decode the information bits transmitted by the UTs. With an MMSE receiver the signal from each UT is decoded individually while treating the interference from all other UTs as colored Gaussian noise. Additionally, the information rate that the AP can support for each UT is independent of the order in which different UTs are decoded at the AP. At low SNRs, the MMSE receiver performs very close to the optimal, capacity-achieving SIC receiver because the performance at low SNRs is dominated by the thermal noise and not by the mutual interference among the UTs.

The following is a quantitative expression of the rates that can be achieved with an MMSE receiver at various SNRs. To this end, let $g_i(w_k)$ denote the i-th column of the channel matrix $G(w_k)$. The covariance of the noise+interference seen in receiving the signal from the i-th UT is:

$$K_z(i, w_k) = N_0 I_{N_{rx},N_{rx}} \sum_{l \neq i} \frac{P_0}{M} g_l(w_k) g_l^*(w_k) \quad (17.1)$$

$$= N_0 \left( I_{N_{rx},N_{rx}} + \sum_{l \neq i} \frac{P_0}{MN_0} g_l(w_k) g_l^*(w_k) \right) \quad (17.2)$$

and the rate achievable on frequency $W_k$ for the i-th UT is:

$$R_{MMSE}(i, w_k) = \log\left(1 + \frac{P_0}{M} g_i^*(w_k) K_z^{-1}(i, w_k) g_i(w_k)\right) \quad (18)$$

The contention-based multi-access average information rate (averaged over the number of sub-carriers L) available to the i-th UT is then:

$$R_{MMSE}(i) = \frac{1}{L} \sum_{k=1}^{L} R_{MMSE}(i, w_k) \quad (19)$$

$$= \frac{1}{L} \sum_{k=1}^{L} \log\left(1 + \frac{P_0}{M} g_i^*(w_k) K_z^{-1}(i, w_k) g_i(w_k)\right) \quad (20)$$

Substituting the expression for $K_z(i,w_k)$ in Equation (20), provides the following expression for the average information rate available to the i-th UT:

$$R_{MMSE}(i) + \quad (21)$$

$$\frac{1}{L} \sum_{k=1}^{L} \log\left(1 + \frac{P_0}{MN_0} g_i^*(w_k) \left(I + \sum_{l \neq i} \frac{P_0}{MN_0} g_l(w_k) g_l^*(w_k)\right)^{-1} g_i(w_k)\right)$$

It is important to note that the $R_{MMSE}(i)$ in Equation (21) is a function of the particular realization of the channels $g_i(w_k)$'s, and it is a function of $P_0$.

Since, a particular transmitting mobile does not know the channels (and even the identity) of other mobiles that are simultaneously transmitting with this mobile, a particular mobile never knows the exact value of $R_{MMSE}(i)$. In other words, as far as a transmitting mobile is concerned $R_{MMSE}(i)$ is a scalar-valued random variable. Let $$CDF\left(R; \frac{P_0}{N_0}\right)$$

denote the cumulative distribution function (CDF) of $R_{MMSE}(i)$, i.e.

$$CDF\left(R; \frac{P_0}{N_0}\right) = Pr(R_{MMSE}(i) < R). \quad (22)$$

It is important to note that the random variable $R_{MMSE}(i)$ has the identical statistical distribution for all i's; since, the channel between all mobiles and the AP are statistically identical. Therefore, the index "i" in $R_{MMSE}(i)$ will be dropped hereafter.

The CDF in Equation (22) can be computed either analytically or through one-time, off-line, Monte Carlo simulations based on the known statistics of the channel $g_i(w_k)$, the known value $$\frac{P_0}{N_0},$$

and the known relationship between $R_{MMSE}$, $g_i(w_k)$, and $$\frac{P_0}{N_0}$$

(this relationship is given by Equation 21).

Secondly, it is important to note that as long as the average information rate (averaged over the L sub-carriers that are used by the i-th UT) transmitted by the i-th UT is less than or equal to $R_{MMSE}(i)$, the AP will be able to correctly decode the packet transmitted by the i-th mobile. This fact, combined with Equation (21) implies that if the average information rate transmitted by the i-th UT is set at $R_0$, the probability that the packet transmitted by the i-th UT will be incorrectly decoded by the AP (i.e., the probability that the channels $g_i(w_k)$'s lead to an $R_{MMSE}(i)$ less than $R_0$) is $$P_e(R_0) = CDF\left(R_0; \frac{P_0}{N_0}\right) \quad (23)$$

In summary, the present invention provides a wireless system in which, if $N_{rx}$ or fewer UTs simultaneously transmit packets to an AP, all of their packets can be correctly decoded by the AP with a given desired reliability. This system can then be combined with the multi-access protocol of FIG. 2 to implement a multi-packet, contention-based, multi-access system in a wireless environment.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. An arrangement for providing a user terminal with access to an access point in a wireless telecommunication network, wherein a plurality of user terminals communicates with the access point utilizing a contention-based, multi-access uplink channel having a defined bandwidth, said arrangement comprising:
    an access point having a plurality of receive antennas for receiving simultaneous uplink transmissions from a number of user terminals, wherein the number of user terminals transmitting on a given slot is less than or equal to the plurality of receive antennas;
    power-control means for controlling transmit power of each of the user terminals to provide received signals of equal average power at the access point;
    means for instructing each of the user terminals to select its transmission data rate based on a noise level at the access point; and
    a receiver in the access point for receiving packets transmitted from the user terminals and for separately demodulating and decoding the packet received from each user terminal.

2. The arrangement according to claim 1, wherein the power-control means includes:
    a transmit power controller within each user terminal for adjusting transmit power; and
    power instructing means in the access point for implementing slow power control with each user terminal, wherein the power instructing means controls the transmit power of each user terminal to compensate for distance-dependent path loss and shadowing so that an average power spectral density of a signal received from each user terminal at the access point, averaged over the defined bandwidth of the uplink channel, is the same for each user terminal.

3. The arrangement according to claim 1, wherein the receiver in the access point is a minimum mean-square error (MMSE) receiver.

4. The arrangement according to claim 3, wherein the MMSE receiver is an MMSE receiver without successive interference cancellation (SIC).

5. The arrangement according to claim 1, further comprising spreading means within each user terminal for spreading each transmitted packet over a plurality of independent frequencies, wherein the independent frequencies are sufficiently far apart that channels at the independent frequencies are mutually uncorrelated.

6. The arrangement according to claim 1, wherein the means for instructing each of the user terminals to select its transmission data rate includes:
    means for receiving from a user, a desired probability that packets received by the access point will be correctly received and decoded; and
    means for instructing each of the user terminals to select its transmission data rate to achieve the desired probability that packets received by the access point will be correctly received and decoded.

7. A method in a wireless telecommunication network for providing a user terminal with access to an access point, wherein the access point is equipped with a plurality of receive antennas, and wherein a number of user terminals communicates with the access point utilizing a contention-based, multi-access uplink channel having a defined bandwidth, said method comprising:
    receiving simultaneous uplink transmissions from a number of user terminals, wherein the number of user terminals transmitting on a given slot is less than or equal to the plurality of receive antennas;
    controlling transmit power of each of the user terminals to provide received signals of equal average power at the access point;
    instructing each of the user terminals to select its transmission data rate based on a noise level at the access point; and
    separately demodulating and decoding the transmissions received from each user terminal.

8. The method according to claim 7, wherein the step of receiving simultaneous uplink transmissions includes receiving uplink transmissions that are each spread over a plurality of independent frequencies sufficiently far apart that channels at the independent frequencies are mutually uncorrelated.

9. The method according to claim 7, wherein the step of controlling transmit power of each of the user terminals includes:
    utilizing slow power control between the access point and each user terminal to adjust the transmit power of each user terminal, wherein the access point sends commands to each user terminal to adjust the transmit power of each user terminal to compensate for distance-dependent path loss and shadowing.

10. The method according to claim 9, wherein the step of utilizing slow power control includes adjusting the transmit power of each user terminal in accordance with the received commands so that an average power spectral density of a signal received at the access point from each user terminal, averaged over the defined bandwidth of the uplink channel, is the same for each user terminal.

11. The method according to claim 7, wherein the step of receiving simultaneous uplink transmissions includes receiving uplink transmissions utilizing a minimum mean-square error (MMSE) receiver without successive interference cancellation (SIC).

12. The method according to claim 7, wherein the packet is transmitted from the user terminal to the access point in a randomly selected slot following the arrival of the packet in the user terminal, said transmitting step being performed without requesting resources from the access point.

13. The method according to claim 12, further comprising:
  detecting by the user terminal, whether its previously transmitted packets were correctly received by the access point;
  if all previously transmitted packets were correctly received by the access point, ending the access method; and
  if a transmitted packet was not correctly received by the access point, retransmitting by the user terminal, the packet that was not correctly received, said packet being retransmitted in a random subsequent slot without requesting resources from the access point.

14. The method according to claim 7, wherein the step of instructing each of the user terminals to select its transmission data rate includes:
  receiving from a user, a desired probability that packets received by the access point will be correctly received and decoded;
  broadcasting the desired probability to the user terminals; and
  selecting by each user terminal, a transmission data rate which provides the desired probability that packets received by the access point will be correctly received and decoded.

15. An access point in a wireless telecommunication network for providing a user terminal with access to the network, and wherein a number of user terminals communicates with the access point utilizing a contention-based, multi-access uplink channel having a defined bandwidth, said access point comprising:
  a plurality of receive antennas for receiving simultaneous uplink transmissions from a number of user terminals, wherein the number of user terminals transmitting on a given slot is less than or equal to the plurality of receive antennas;
  power controlling means for sending power-control commands to each of the user terminals, said commands instructing each of the user terminals to adjust its transmit power to provide received signals of equal average power at the access point;
  data rate controlling means for instructing each of the user terminals to transmit packets at a data rate based on a noise level at the access point; and
  a receiver for receiving and separately demodulating and decoding packets transmitted from the user terminals.

16. The access point of claim 15, wherein the receiver is adapted to receive simultaneous uplink transmissions that are each spread over a plurality of independent frequencies sufficiently far apart that channels at the independent frequencies are mutually uncorrelated.

17. The access point according to claim 16, wherein the receiver is a minimum mean-square error (MMSE) receiver without successive interference cancellation (SIC).

18. The access point according to claim 16, wherein the data rate controlling means includes:
  means for receiving from a user, a desired probability that packets received by the access point will be correctly received and decoded; and
  means for instructing each of the user terminals to select its transmission data rate to achieve the desired probability that packets received by the access point will be correctly received and decoded.

* * * * *